United States Patent [19]

Jones et al.

[11] Patent Number: 5,763,336
[45] Date of Patent: Jun. 9, 1998

[54] BULKY COMPOSITE SHEET MATERIAL

[75] Inventors: David Charles Jones; Stasys Kestutis Rudys, both of Midlothian, Va.; Charles Benjamin Simon, Blue Bell, Pa.

[73] Assignee: E. I. du Pont de Nemours and Company, Wilmington, Del.

[21] Appl. No.: 644,348

[22] Filed: May 10, 1996

Related U.S. Application Data

[63] Continuation of Ser. No. 590,713, Jan. 24, 1996, abandoned.

[51] Int. Cl.$^6$ .................... B32B 5/08; B32B 27/02
[52] U.S. Cl. .................... 442/382; 442/389; 442/401
[58] Field of Search ........................ 442/382, 389, 442/401

[56] References Cited

U.S. PATENT DOCUMENTS

| | | | |
|---|---|---|---|
| 3,169,899 | 2/1965 | Steuber | 161/72 |
| 3,870,592 | 3/1975 | Brock et al. | 161/148 |
| 4,041,203 | 8/1977 | Brock et al. | 428/157 |
| 4,569,874 | 2/1986 | Kuznetz | 428/109 |
| 4,647,497 | 3/1987 | Weeks | 428/284 |
| 4,684,568 | 8/1987 | Lou | 428/265 |
| 4,692,368 | 9/1987 | Taylor et al. | 428/137 |
| 4,766,029 | 8/1988 | Brock et al. | 428/286 |
| 4,929,303 | 5/1990 | Sheth | 156/209 |
| 5,013,599 | 5/1991 | Guckert et al. | 428/286 |
| 5,160,700 | 11/1992 | Anderson et al. | 422/34 |
| 5,290,628 | 3/1994 | Lim et al. | 428/299 |
| 5,308,691 | 5/1994 | Lim et al. | 428/286 |
| 5,415,925 | 5/1995 | Austin et al. | 428/287 |
| 5,554,437 | 9/1996 | Gupta et al. | 428/286 |

FOREIGN PATENT DOCUMENTS

| | | |
|---|---|---|
| 1332920 | 11/1994 | Canada. |
| 61-29537 | 2/1986 | Japan. |
| 61-29538 | 2/1986 | Japan. |
| 61-97483 | 5/1986 | Japan. |

OTHER PUBLICATIONS

Encyclopedia of Chemical Technology, vol. 16, John Wiley & Sons, NY, pp. 76–77, 1981.

*Primary Examiner*—Kathleen Choi

[57] ABSTRACT

A nonwoven bulky composite sheet material as first and second vapor permeable layers on opposite sides of a third layer of a bulky, flexible material. The third layer has a thickness in the range of 0.3 to 3.0 mm before being bonded between said first and second layers. The first layer, the second layer and the third layer are bonded together to form a flexible composite sheet with a thickness of at least 0.3 3 mm and a moisture vapor transmission of at least 100 g/m$^2$ in 24 hours.

13 Claims, 1 Drawing Sheet

BULKY COMPOSITE SHEET MATERIAL

This is a continuation of Ser. No. 08/590,713, filed Jan. 24, 1996, now abandoned.

FIELD OF THE INVENTION

This invention relates to a composite sheet material and more particularly to a bulky, vapor permeable, laminated sheet suitable for use as an impact resistant packaging material.

BACKGROUND OF THE INVENTION

Packaging materials protect packed items against surface damage and they cushion packed items against denting and breakage. Examples of existing packaging materials include plastic bubble wrap, paper, cardboard, adhesive films, Styrofoam, and sheeting materials made of nylon, polyester and cotton.

When an item to be packed is made of or coated with a synthetic material that releases solvent gases, it is important that the packaging material not trap released gases or moisture against the packed item where such trapped gases or moisture can generate discolorations or blemishes in the finish ("witness marks") on the item's surface. Unfortunately, many existing plastic and foam packaging materials are vapor impermeable. Accordingly, there is a need for a packaging material that can protect packed items without trapping moisture or off-gassing solvents.

Another drawback of certain existing bulky packaging materials, such as paper and cardboard, is that items having smooth finishes can be easily scratched by such materials. Thus, there is a need for a bulky packaging material that does not abrade the surface of packaged items.

Many existing packaging materials are both voluminous and not reusable. Recipients of items packed in such materials must frequently incur significant disposal costs. Therefore, there is a need for a packaging material that is strong and durable enough to survive multiple uses and launderings such that the material is truly reusable.

SUMMARY OF THE INVENTION

The invention provides a nonwoven bulky composite sheet material. The material has a first and a second layers of a synthetic sheet having a water vapor transmission rate of at least 100 g/m² in 24 hours according to ASTM standard E96, method B, and having a Grab tensile strength of at least 60N. The material has a third layer of a bulky, flexible material bonded between the first and second layers, the third layer having a thickness in the range of 0.3 to 3.0 mm before being bonded between said first and second layers. The first layer, the second layer and the third layer are bonded together to form a flexible composite sheet with a thickness in the range of 0.3 to 2.5 mm and a moisture vapor transmission rate of at least 100 g/m² in 24 hours according to ASTM standard E96, method B. The first and second layers of the composite sheet material are preferably fibrous, nonwoven, bonded sheets with a thickness less than 1 mm and a basis weight less than 125 g/m². More preferably, the first and second layers of the composite sheet are comprised of a flash-spun polyethylene plexifilamentary film-fibril sheet, having a basis weight in the range of 25 to 100 g/m². It is preferred that the third layer have a bulk density in the range of 0.02 to 0.05 g/cm³ before being bonded between the first and second layers.

BRIEF DESCRIPTION OF THE DRAWINGS

The accompanying drawings, which are incorporated in and constitute a part of this specification, illustrate the presently preferred embodiments of the invention and, together with the description, serve to explain the principles of the invention.

DETAILED DESCRIPTION OF THE PREFERRED EMBODIMENTS

Figure 1:
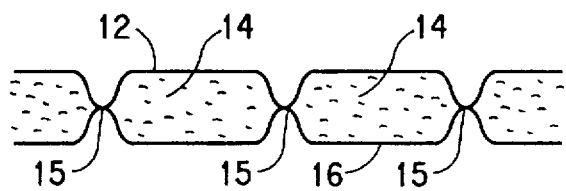
FIG. 1 shows a cross section of a composite sheet according to one embodiment of the invention.

Reference will now be made in detail to the presently preferred embodiments of the invention, which are illustrated in the accompanying drawings. Throughout the drawings, like reference characters are used to designate like elements.

FIG. 1 shows a cross section of the composite sheet of the present invention. The composite sheet 10 is a trilaminate sheet having thin outer layers 12 and 16 and a bulky inner layer 14 sandwiched therebetween. Layers 12, 14 and 16 are preferably held together by ultrasonic bonding or heat bonding.

According to the invention, the thin outer layers of the composite sheet 10 are comprised of a synthetic nonwoven sheet material. Layers 12 and 16 should be vapor-permeable (i.e., the sheet should have a water vapor transmission rate of at least 100 g/m² in 24 hours according to ASTM standard E96, method B). It is also important that sheet layers 12 and 16 be tear resistant. The strength of the outer sheet layers 12 and 16 give the overall composite structure the strength required for true reusability. Preferably sheets 12 and 16 have a tear strength of at least 17 Newtons according to the Trapezoidal Tear Strength Test ASTM D 1117, Section 14. It is preferred that the sheet material not be abrasive to the surface of items that might be packed in the sheet material. It is also preferred that sheets 12 and 16 be inert to the painted or treated surfaces of packed items.

Particularly well suited for outer layers 12 and 16 of composite sheet 10 are sheets of spunbonded nonwoven polyolefin film-fibrils of the type disclosed in U.S. Pat. No. 3,169,899 or vapor-permeable fabric sheets of the type disclosed in U.S. Pat. No. 4,684,568, the contents of which are both incorporated by reference herein. Polyethylene and polypropylene are the polyolefins of choice. A commercial spunbonded nonwoven polyethylene film-fibril sheet product that is particularly suitable to the composite sheet of the invention is TYVEK® spunbonded polyolefin sheet sold by E. I. du Pont de Nemours and Company of Wilmington, Del. TYVEK® is a registered trademark of DuPont. TYVEK® spunbonded polyolefin sheets are flexible, lightweight, strong and vapor permeable. TYVEK® sheets also have a very low abrasiveness and they are inert to most painted surfaces. Another vapor permeable sheet material suitable for outer layers 12 and 16 of the composite sheet of the invention is a spunbonded/meltblown/meltblown/spunbonded ("SMMS") polypropylene sheet material, as for example Evolution sheet material sold by Kimberly-Clark Corporation of Neenah, Wis. Similarly, a microporous films such as Exxaire film sold by Exxon Chemical Company of Houston, Tex. are suitable for outer layers 12 and 16 of the composite sheet of the invention.

A particularly preferred sheet product for use in the invention is TYVEK® 1461-L sheet, due to its advantageous moisture vapor transmission rate which has been measured using ASTM E-96, method B to be between 600 and 1100 g/m² in 24 hrs. TYVEK® 1461-L sheet has a thickness of between 0.1 and 0.25 mm and a basis weight of about 59 gr/m². The Trapezoidal Tear Strength for TYVEK® 1461-L sheet is between 25 and 60 Newtons. TYVEK® 1461-L sheet is made of high density polyethylene, which makes it both readily recyclable and inert to most painted surfaces. In addition, TYVEK® 1461-L sheet can be readily printed with advertising or other information and it can also be laundered repeatedly.

TYVEK® sheets are especially well suited for outer layers 12 and 16 because TYVEK® sheets have been found to be less abrasive than many other synthetic packaging materials. For example, when a sheet of TYVEK® with a basis weight of about 74 g/m² was used as the abrading surface in a standard crock meter and was rubbed 100 times against a painted automobile panel under a pressure 81 kPa, no scratches were observed. The steel vehicle panel used in the test was painted with one coat of Centari® black color non-metalic paint (Reference No. 872-AB921) and with one coat of Generation 3® clear coat (Reference No. RK7103). Centari® and Generation 3® are registered trademarks for products of E. I. DuPont de Nemours & Company, of Wilmington, Del. When similar sheets of Nylon and of a polyester-cotton blend materials were applied to the same surface using the same procedure, significant scratching was observed. When a microporous film was used as the abrading surface in the same test procedure, hairline scratches were also observed.

The third layer 14 of the composite sheet is comprised of a flexible, vapor permeable, bulky material, having a thickness in the range of 0.3 to 3.0 mm and a bulk density in the range of approximately 0.02 to 0.05 g/cm³. One bulky material that has been found especially suitable for use in the composite sheet of the invention is a bicomponent, fused fabric sheet composed of polyethylene with a core of polyethylene terepthalate staple fibers that is sold under the brand code 91C7 by the Chicopee Division of PGI Nonwovens, doing business in New Brunswick, N.J. This sheet material is highly porous, it has a nominal thickness of 1.73 mm, it has a nominal basis weight of 44 g/m², and it has a nominal bulk density of 0.026 g/m³.

Layer 14 is held between layers 12 and 16 when the layers are bonded at selected bonding points. At bonding points 15, layers 12 and 16 are fused together through a compressed portion of bulky layer 14. Layers 12 and 16 can be fused at bonding points 15 with conventional thermal point bonding equipment, or with ultrasonic bonding equipment as shown schematically in FIG. 4. Preferably, the composite sheet is held together by between three and eight 1.6 mm² bonding points per square centimeter. Alternatively, some other desired bonding pattern such as broken or continuous lines can be applied.

Figure 4:
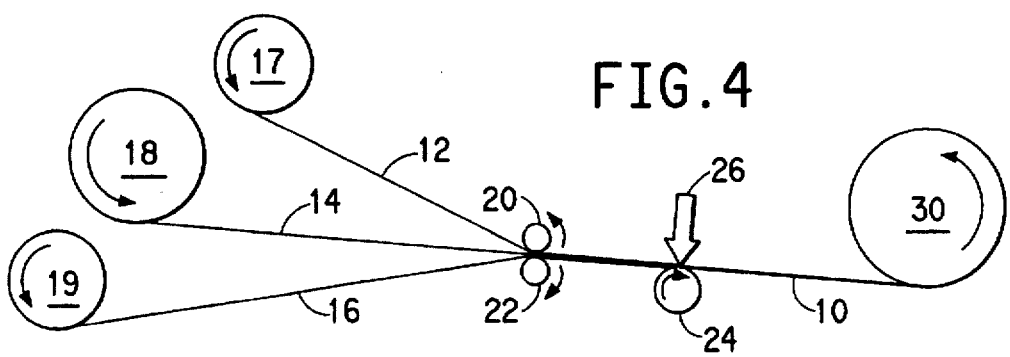
FIG. 4 is a schematic diagram showing a process for ultrasonically bonding the composite sheets shown in FIGS. 1 and 2.

As shown in FIG. 4, layers 12, 14 and 16 are unrolled from feed rolls 17, 18 and 19, respectively, and are fed between rollers 20 and 22 to an ultrasonic bonding device 26. The ultrasonic bonding device 26 can be any type of conventional ultrasonic bonding equipment. In making the bonded composite sheet of the invention, the sheet layers are passed between an ultrasonic horn of bonding device 26 and a patterned backup roll 24. Ultrasonic energy from the horn is emitted in short bursts so as to heat raised areas on the backup roll 24. The fibers of sheets 12 and 16 contact the heated raised surfaces on backup roll 24 and are momentarily partially melted. This partial melting results in welded spots 15 corresponding to the pattern on backup roll 24.

Figure 2:
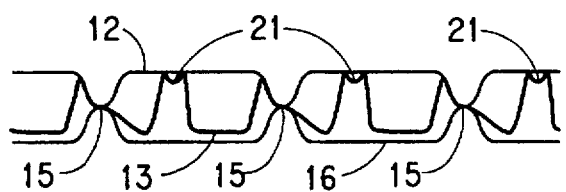
FIG. 2 shows a cross section of a composite sheet according to another embodiment of the invention.

Another bulky material that has been found suitable for use in the bulky layer of the composite sheet of the invention is Visapore 8.75 Hex perforated polyethylene film sold by Tredegar Film Products of Richmond, Va. Visapore is a 0.04 mm thick polyethylene film with hexagonally shaped perforations 21 that give the film a lofted thickness of 0.89 to 1.17 mm. The Visapore Film has a bulk density in the range of 0.034 to 0.045 g/cm³. As shown in FIG. 2, outer layers 12 and 16 are fused on opposite sides of a bulky layer of Visapore film 13 at bonding points 15. Layers 12 and 16 can be fused to the Visapore film 13 at bonding points 15 with conventional thermal point bonding equipment, or with ultrasonic bonding equipment as described above with reference to FIG. 4. An additional advantage of using the Visapore perforated polyethylene film is that when Visapore is bonded between layers of TYVEK® flashspun polyethylene sheet, an entirely recyclable composite sheet is obtained.

Figure 3:
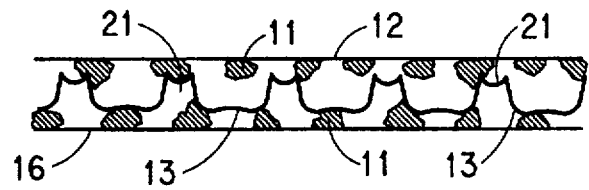
FIG. 3 shows a cross section of a composite sheet according to another embodiment of the invention.
Figure 5:
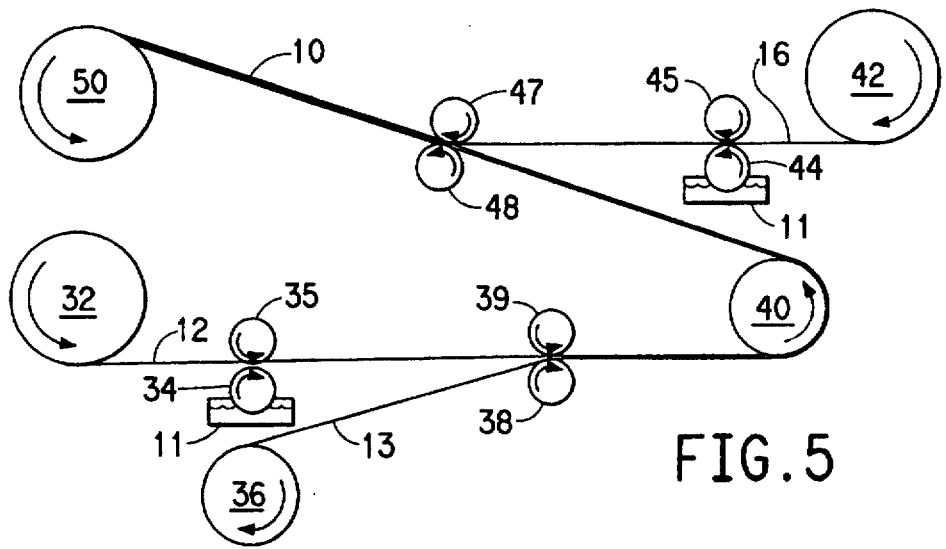
FIG. 5 is a schematic representation showing a process for adhesively bonding the composite sheet shown in FIG. 3.

In an alternative embodiment of the invention shown in FIG. 3, outer sheet layers 12 and 16 are bonded to opposite sides of the bulky layer 13 by an adhesive 11. Preferably, the adhesive 11 is a vinyl acetate and polyethylene adhesive. As shown in FIG. 5, sheet layer 12 is unrolled from roller 32 and passed between an engraved applicator roll 34 and a nip roller 35. Adhesive 11 is coated on the bottom of sheet layer 12 in a pattern corresponding to that of engraved applicator roll 34. Bulky layer 13 is unrolled from roller 36 and adhered to the adhesive coated side of sheet layer 12 by passing the layers 12 and 13 between nip rollers 38 and 39. The direction of the resulting bilaminant structure is subsequently changed by roller 40. Another layer 16 is unrolled from roller 42 and passed between an engraved applicator roll 44 and a nip roller 45. Adhesive 43 is coated on the underside of layer 16 in a pattern corresponding to that on applicator roll 44. Coated layer 16 is subsequently pressed against the exposed surface of layer 13 between the nip rollers 47 and 48. The resulting trilaminant sheet 10, a cross section of which is shown in FIG. 3, is collected on take-up roll 50. If only one adhesive coating station is available, the step accomplished by rollers 44 and 45 could be accomplished with a second pass through rollers 34 and 35.

EXAMPLES

In the description above and in the non-limiting examples that follow, the following test methods were employed to determine various reported characteristics and properties. ASTM refers to the American Society of Testing materials. TAPPI refers to the Technical Association of the Pulp and Paper Industry.

Basis weight was determined by ASTM D-3776-85, which is hereby incorporated by reference, and is reported in g/m².

Tensile strength was determined by ASTM D 1682, Section 19, which is hereby incorporated by reference, and is reported in N/linear cm.

Grab tensile strength was determined by ASTM D 1682, Section 16, which is hereby incorporated by reference, and is reported in Newtons.

Trapezoidal Tear strength is a measure of the relative ease of tearing of nonwoven fabrics. The trapezoidal tear strength was determined by ASTM D 1117, Section 14, which is hereby incorporated by reference, and is reported in Newtons.

Moisture Vapor Transmission was determined by ASTM E96, Method B, which is hereby incorporated by reference, and is reported in g/m²/24 hr.

Mullen Burst was determined by TAPPI 403-85, which is hereby incorporated by reference, and is reported in kPa.

Hydrostatic head measures the resistance of a sheet to the penetration by liquid water under a static load. A 316 cm² sample is mounted in an SDL Shirley Hydrostatic Head Tester (manufactured by Shirley Developments Limited, Stockport, England). Water is pumped against one side of the sample until the sample is penetrated by water. The measured hydrostatic pressure is reported in centimeters of water. The test generally follows ASTM D 2724, which is hereby incorporated by reference.

EXAMPLE 1

In this example, six samples were made as shown in FIG. 1. The outer layers of the composite sheet were comprised of TYVEK® 1461-L sheet and the inner bulky layer was comprised of a polyethylene sheet with a core of polyethylene terepthalate fiber sold under the brand code 91C7 by the Chicopee Division of PGI Nonwovens. The layers of the composite sheet were ultrasonically bonded as described above with reference to FIG. 4 with approximately eight 1.6 mm² bonding points per cm². The following is the average of the physical properties measured for the samples tested.

| Thickness | 0.64 mm |
| --- | --- |
| Basis Weight | 172.8 g/m² |
| Bulk Density | 0.27 g/cm³ |
| Tensile Strength - MD | 77.0 N/cm |
| Tensile Strength - XD | 90.4 N/cm |
| Mullen Burst | 1499.6 kPa |
| Hydro Head | 278 cm |
| Grab Tensile - MD | 423.8 N |
| Grab Tensile - XD | 452.2 N |
| Trapezoidal Tear - MD | 52.1 N |
| Trapezoidal Tear - XD | 57.5 N |
| Moisture Vapor Transmission | 794.0 g/m²/24 hr |

EXAMPLE 2

In this example, six samples were made as shown in FIG. 2. The outer layers of the composite sheet were comprised of TYVEK® 1461-L sheet and the inner bulky layer was comprised of Visapore 8.75, Style X-6708, hexagonally perforated high density polyethylene film sold by Tredegar Film Products. The layers of the composite sheet were ultrasonically bonded as described above with reference to FIG. 4 with approximately eight 1.6 mm² bonding points per cm². The following is the average of the physical properties measured for the samples tested.

| Thickness | 0.48 mm |
| --- | --- |
| Basis Weight | 149.1 g/m² |
| Bulk Density | 0.31 g/cm³ |
| Tensile Strength - MD | 68.0 N/cm |
| Tensile Strength - XD | 86.5 N/cm |
| Mullen Burst | 1474.8 kPa |
| Hydro Head | 127.8 cm |
| Grab Tensile - MD | 421.7 N |
| Grab Tensile - XD | 548.4 N |
| Trapezoidal Tear - MD | 89.0 N |
| Trapezoidal Tear - XD | 56.0 N |
| Moisture Vapor Transmission | 434 g/m²/24 hr |

EXAMPLE 3

In this example, six samples were made as shown in FIG. 3. The outer layers of the composite sheet were comprised of TYVEK® 1461-L sheet and the inner bulky layer was comprised of Visapore 8.75, Style X-6708, hexagonally perforated high density polyethylene film sold by Tredegar Film Products. The layers of the composite sheet were adhesively bonded as described above with reference to FIG. 5 using vinyl acetate and polyethylene adhesive. The following is the average of the physical properties measured for the samples tested.

| Thickness | 0.71 mm |
| --- | --- |
| Basis Weight | 176.2 g/m² |
| Bulk Density | 0.25 g/cm³ |
| Tensile Strength - MD | 55.7 N/cm |
| Tensile Strength - XD | 54.3 N/cm |
| Mullen Burst | 1439.6 kPa |
| Hydro Head | 241.8 cm |
| Grab Tensile - MD | 348.3 N |
| Grab Tensile - XD | 473.3 N |
| Trapezoidal Tear - MD | 76.5 N |
| Trapezoidal Tear - XD | 60.5 N |
| Moisture Vapor Transmission | 633.0 g/m²/24 hr |

EXAMPLE 4

A 343 cm by 76 cm section of the composite sheet structure like that described with reference to FIG. 1 was stitched around its perimeter with an elastic band. The sample was tested for launderability. The sample was laundered three times in a commercial laundry. Each laundering cycle included a 15 minute detergent wash at 140° F., a two minute water rinse at 140° F., a 5 minute bleaching in a 140° F. bleach solution, two three minute water rinses at 140° F., a three minute water rinse at 120° F., a three minute water rinse at 100° F., and tumble drying at 70° F. The detergent used was Tergitol 14-S-9 sold by Union Carbide Company of New York, N.Y., and the bleach solution consisted of 1% sodium hypochlorite in water. At the conclusion of the test, the sample was completely intact, showing no signs of tearing or delamination.

EXAMPLE 5

It has been found that the composite sheet structure of the invention makes an excellent packing material for painted motor vehicle parts. In a field test, 30 covers for automobile bumpers were made like the samples described in Example 4. Each cover was placed around an automobile bumper that was nested and stacked with other similarly covered bumpers and shipped from an original equipment parts manufacturer to a vehicle manufacturing plant. When the bumpers were unpacked at the vehicle manufacturing plant, the bumper covers were returned to the original equipment parts manufacturer for re-use. After each cover was so used ten times and subjected to three commercial launderings, the covers were inspected. Upon inspection, each of the covers was completely intact, and showed no signs of tearing or delamination.

It will be apparent to those skilled in the art that modifications and variations can be made in the composite sheet of this invention. The invention in its broader aspects is, therefore, not limited to the specific details or the illustrative examples described above. Thus, it is intended that all matter contained in the foregoing description, drawings and examples shall be interpreted as illustrative and not in a limiting sense.

We claim:

1. A bulky composite sheet material particularly suited for use as an impact resistant packaging material, comprising:

first and second layers of a synthetic, fibrous, nonwoven, bonded sheets having a moisture vapor transmission rate of at least 100 g/m2 in 24 hours according to ASTM standard E96, method B, having a grab tensile strength of at least 60N according to ASTM D 1682, Section 19, having a thickness of less than 1 mm, and having a basis weight of less than 125 g/m2;

a third layer of a bulky, flexible bonded material between said first and second layers, said third layer having a bulk density in the range of 0.02 to 0.05 g/cm3 and a thickness in the range of 0.3 to 3.0 mm before being bonded between said first and second layers;

said first layer, said second layer and said third layer being melt bonded together to form a flexible composite sheet with a thickness of at least 0.3 mm and a moisture vapor transmission of at least 100 g/m2 in 24 hours according to ASTM standard E96, method B.

2. A bulky composite sheet material particularly suited for use as an impact resistant packaging material, comprising:

first and second layers of a synthetic, fibrous, nonwoven, bonded sheets having a moisture vapor transmission rate of at least 100 g/m$^2$ in 24 hours according to ASTM standard E96, method B, having a grab tensile strength of at least 60N according to ASTM D 1682, Section 19, having a thickness of less than 1 mm, and having a basis weight of less than 125 g/m$^2$;

a third layer of a bulky, flexible bonded material between said first and second layers, said third layer having a bulk density in the range of 0.02 to 0.05 g/cm$^3$ and a thickness in the range of 0.3 to 3.0 mm before being bonded between said first and second layers;

said first layer, said second layer and said third layer being adhesive bonded together to form a flexible composite sheet with a thickness of at least 0.3 mm and a moisture vapor transmission of at least 100 g/m$^2$ in 24 hours according to ASTM standard E96, method B.

3. The composite sheet of claim 1 wherein said first and second layers are comprised of a flash-spun polyethylene plexifilamentary film-fibril sheet, having a basis weight in the range of 25 to 100 g/m$^2$.

4. The composite sheet of claim 3 wherein a section of said composite sheet does not scratch a metal sheet coated with conventional automobile paint finish when the composite sheet is rubbed 100 times with a pressure of 81 kPa against the paint finish using a crock meter.

5. The composite sheet of claim 3 wherein said third layer comprises an unbonded sheet of polyester staple fiber.

6. The composite sheet of claim 5 wherein said first layer, said second layer and said third layer are bonded together at least three ultrasonically generated bonding points per square centimeter of the composite sheet.

7. The composite sheet of claim 2 wherein said first, second and third layers each have opposite first and second sides, one side of said first layer being adhesively bonded to the first side of said bulky third layer, and one side of said second layer being adhesively bonded to the second side of said bulky third layer.

8. The composite sheet of claim 5 wherein the sheet can be laundered in soap and water at least one time without the first, second and third layers of the composite sheet becoming separated.

9. The composite sheet of claim 3 wherein said bulky third layer comprises a sheet of perforated polyethylene film having a lofted thickness in the range of 0.5 to 1.5 mm.

10. The composite sheet of claim 9 wherein said first layer, said second layer and said third layer are bonded together by at least 3 ultrasonically generated bonding points per square centimeter of the composite sheet.

11. The composite sheet of claim 10 wherein the sheet can be laundered in soap and water at least one time without the first, second and third layers of the composite sheet becoming separated.

12. The composite sheet of claim 9 wherein said composite sheet consists essentially of polyethylene.

13. A packaging cover comprised of the composite sheet material of claim 3.

* * * * *